Inventor
LEO CATALLO

UNITED STATES PATENT OFFICE 2,582,231

ABRASIVE TOOL AND METHOD OF MAKING SAME

Leo Catallo, Detroit, Mich., assignor to Wheel Trueing Tool Company, Detroit, Mich., a corporation of Delaware Application February 5, 1949, Serial No. 74,783

4 Claims. (Cl. 51—309)

The present invention relates to a diamond tool and the method for preparing the same, and more particularly to a diamond drill bit and the method for preparing such a bit.

An object of the present invention is to provide a method for the preparation of a diamond tool in which the diamonds are firmly encased in the tool and the metallic surface surrounding the diamond is of exceptional hardness and durability.

Another object of the invention is to provide a method for preparing a diamond tool having a body of tungsten and tungsten carbide and a surface coating of tungsten carbide holding the diamonds in position.

Another object of the invention is to provide a diamond bit having diamond particles embedded in a hard, erosion resistant surface.

Still another object of the invention is to provide a diamond bit having a body of tungsten and tungsten carbide capable of being easily joined to a tool shank.

Briefly, the invention comprises a system wherein tungsten metal to be used as a body metal for the tool bit is caused to combine with carbon from a carbon mold, thus forming a surface layer of tungsten carbide on the working face of the tool which holds the diamonds in their proper oriented position and furnishes the drill bit with a hard, erosion resistant surface.

More particularly, a carbon mold is provided having recesses machined or engraved therein which correspond to the general configuration of the finished tool bit. Into the base of the mold structure, there is introduced a relatively large number of discrete diamond particles held in position along the base of the mold as by means of a setting matrix. The diamonds may be set at the base of the mold in the same horizontal plane, or they may be arranged in a set of inclined planes or steps, depending upon the configuration desired in the finished diamond bit. When the diamond particles have been arranged in their appropriate positions along the base of the mold, the particles are covered with a particulated mixture of tungsten metal and tungsten carbide, to a sufficient depth to cover the exposed diamond surfaces. Next, a layer of tungsten powder is inserted into the mold to completely cover the mixture of tungsten and tungsten carbide which has been previously disposed therein. The mold assembly, containing the diamond particles, the layer of tungsten and tungsten carbide, and superimposed layer of tungsten powder is next subjected to a cold pressing operation in the range from 400 to 600 p. s. i. After this initial cold pressing operation, a slug or block of brazing material is placed over the compressed mass. The preferred brazing material to be used in accordance with this invention is a nickel-copper-zinc alloy commonly known as German silver. Normally, such an alloy will contain about 19 to 44% zinc, 16 to 22% nickel, and the balance copper. It will be appreciated that other brazing material such as bronze may be used, but I prefer to use German silver because of its exceptional corrosion resistance.

The compacted mass together with the slug of brazing material is next placed in a furnace maintained at a temperature somewhat below the melting point of the brazing material. The temperature in the furnace will normally be between 1700° to 2100° F. during this operation.

The mold and its contents are heated at this temperature for a time sufficient to cause the carbon of the mold to combine with the tungsten powder, causing the formation of tungsten carbide on the surface of the tool. This preheating step will normally be carried out for a period of one hour or more. The surface layer of tungsten carbide produced on the face of the tool serves to hold the diamonds firmly in their previously determined positions, as well as imparting an extremely erosion-resistant, hard surface to the finished tool bit.

After the aforementioned preheating step, the temperature of the furnace is raised above the melting point of the brazing material, to allow the brazing material to melt and become diffused into the interstices of the tungsten-tungsten carbide compact. In the case of German silver, the furnace is maintained at a temperature of about 2100° to 2300° F. for a period of time in the vicinity of twenty minutes. Additional amounts of tungsten carbide are formed during the second heating step.

Following the second heating operation, the mold and its contents are removed from the furnace and again pressed, before cooling, at a pressure in the range from 400 to 600 p. s. i. The mold assembly is then allowed to cool, and the bit is subsequently removed from the mold.

Photomicrographs of the drill bits produced in the manner herein disclosed show an appreciable variation in the structure extending from the outer surface to the interior of the piece. At the outer surface, large, white areas of massive tungsten carbide are quite prominent, while further in the interior of the piece, there occurs a well distributed finely divided tungsten carbide-tungsten mixture.

At the outer surface, the white carbide constituent was found to have a Vickers hardness number from 2532 to 2600. The Vickers hardness of the material in the body of the tool was in the range from 276 to 363, with the white constituent of the relatively uniform mass having a Vickers number of about 2311.

In preparing the mixture of tungsten powder and tungsten carbide used to initially cover the diamonds, I have found that the best results can be obtained by regulating the particle size of the components present in the mixture. Thus, a particularly suitable tungsten-tungsten carbide mixture may be formed by preparing a tungsten powder having a particle size of less than about 200 mesh, and combining the 200 mesh or finer tungsten particles with an equal part by volume of each of the following tungsten carbides: 1 part of tungsten carbide having a particle size from 100 to 200 mesh; 1 part tungsten carbide particles having a particle size of 40 to 100 mesh; and 1 part of tungsten carbide particles having a particle size in the range of 30 to 40 mesh. The ingredients listed above are mixed together in a dry state, until a relatively uniform consistency is obtained.

A further description of the present invention will be made in connection with the attached sheets of drawings.

Figure 1:
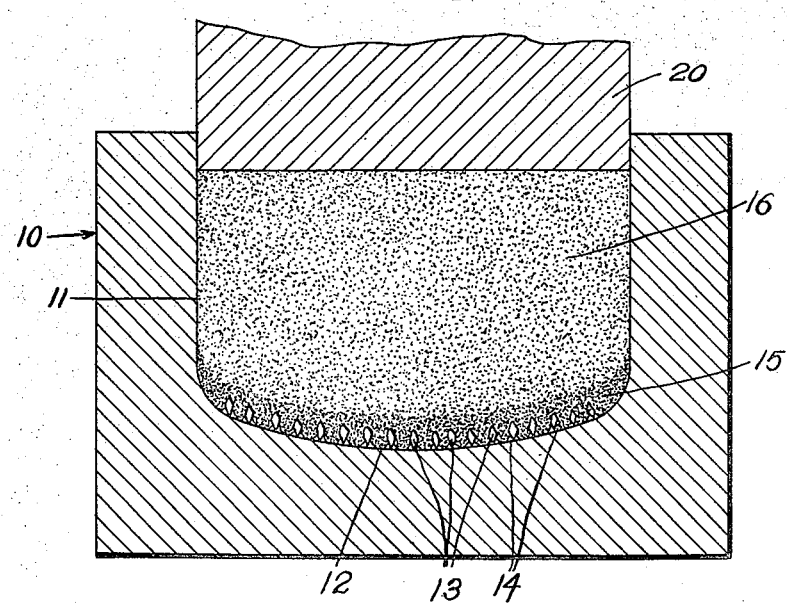
Figure 1 is a vertical cross-sectional view of the mold showing the location of the diamonds therein and the powder layers prior to formation of the powdered metal into a coherent body.
Figure 2:
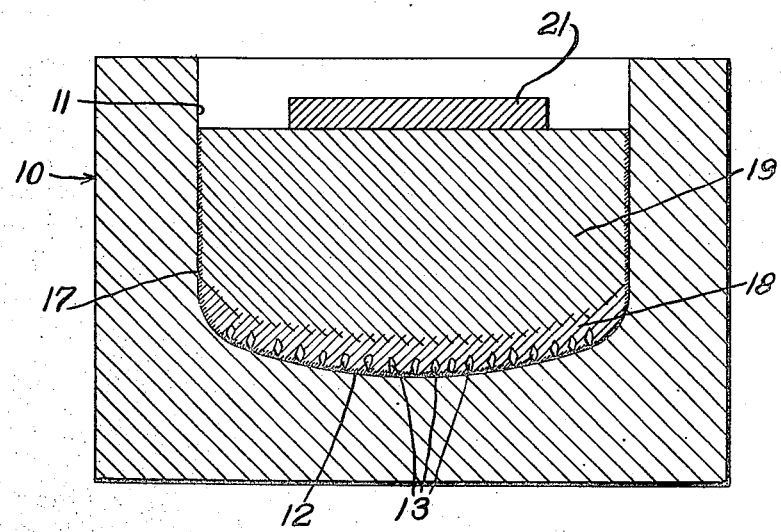
Figure 2 is a view similar to Figure 1, and illustrates the mold assembly after the powdered metal composition has been formed into a coherent mass, and a block of brazing metal has been disposed over the solid body metal.

Reference numeral 10 denotes generally a carbon mold the interior of which is machined into a configuration desired in the finished cutting tool, including side walls 11 and a base portion 12. Disposed along the base wall 12 are plurality of diamonds or diamond particles 13 which are held in a substantially upright position by virtue of setting matrix 14 which may be composed of any sticky or tacky composition. Over and between the diamonds 13, there is disposed a layer of a mixture of powdered tungsten and tungsten carbide 15. The layer 15 is preferably composed of powdered tungsten together with powdered tungsten carbide of varying mesh, as hereinbefore described. The layer 15 is normally of sufficient height to completely encase the diamond particles 13, and fill the space between the individual diamonds. Above the metallic powder mixture 15, the mold cavity is filled to any desired depth with a layer of powdered tungsten 16 in finely divided form.

The mold assembly, containing the diamond particles, tungsten carbide-tungsten layer, and powdered tungsten layer is then subjected to a pressure in the range from 400 to 600 p. s. i. to form the powder layers into a compact, coherent mass. This condition is represented schematically in Figure 1 by a ram 20.

A block of brazing material 21 is then placed above the compact, and the mold assembly is placed into a furnace maintained at a temperature below the melting point of the brazing material. This step results in the production of a layer of tungsten carbide 17 at the surface of contact between the metallic layers, the side wall 11, and the base 12. The conditions of heat and pressure mentioned above serve to form the layer of tungsten-tungsten carbide into a solid mass 18 and the overlying powdered tungsten layer is formed into a solid tungsten mass 19. After the primary heat treatment, the temperature of the furnace is raised above the melting point of the brazing material, causing the latter to diffuse into the solid tungsten mass 19 to form a bond with the body of the tool, thus providing a relatively soft material to which a toll shank may be attached.

In the finished tool so produced, the diamonds are surrounded by a surface layer of massive tungsten carbide in a sintered matrix of finely divided tungsten and tungsten carbide, which layer provides a very hard and abrasive-resistant surface, while the region inwardly of said surface is of lesser hardness and greater ductility and toughness. It is this dual structure that is responsible for the excellent performance of the tool of my invention.

It is evident that many modifications may be made to the present invention without departing from the principle of the invention disclosed, and it is not my intention to limit the invention to any single embodiment, but limited only as necessitated by the scope of the appended claims.

I claim as my invention:

1. A diamond tool comprising a body portion formed of a coherent sintered mass of tungsten and tungsten carbide, diamond particles embedded in a surface of said body portion, and a surface layer of massive tungsten carbide surrounding said diamond particles the massive tungsten carbide in said surface layer having a Vickers hardness number of around 2532 to 2600 and said matrix having a Vickers hardness number of around 276 to 363.

2. A diamond tool comprising a body portion formed of a coherent sintered mass of tungsten and tungsten carbide particles, diamond particles embedded in a surface of said body portion, and a surface layer of massive tungsten carbide in a matrix of tungsten and tungsten carbide between said diamond particles.

3. The method of making a diamond drill bit, which comprises providing a carbon mold having an internal recess corresponding to the configuration of said bit, disposing discrete diamond particles in predetermined positions against the bottom of said recess, placing a powdered layer of a mixture of tungsten carbide and tungsten over said diamond particles and in contact therewith and with the bottom of said recess, placing a layer of tungsten particles over said tungsten-tungsten carbide layer, compacting said powdered layers, disposing brazing material over the resulting compact, heating said compact in contact with said brazing material for at least one hour at a temperature in the range of from 1700° F. to 2100° F. to cause formation of massive tungsten carbide by the interaction of said tungsten-tungsten carbide mixture and carbon from said mold, heating further at a temperature above 2100° F. to cause said brazing compound to infiltrate and become firmly bonded with said compact, and compressing the resulting mass before cooling the same.

4. The method of making a diamond drill bit, which comprises providing a carbon mold having an internal recess corresponding to the configuration of said bit, disposing discrete diamond particles in predetermined positions against the bottom of said recess, placing over said diamonds in contact therewith and with the bottom of said recess a powdered layer of a mixture of tungsten powder of around 200 mesh and a tungsten carbide of varying particle size between 30 and 200 mesh, placing a layer of powdered tungsten particles over said tungsten-tungsten carbide layer, compacting said powdered layers, disposing solid brazing material over the resulting compact, heating said compact in contact with said brazing material for at least one hour at a temperature in the range of from 1700° F. to 2100° F. to cause formation of massive tungsten carbide by the interaction of said tungsten-tungsten carbide mixture and carbon from said mold, heating further at a temperature above 2100° F. to cause said brazing compound to fuse and flow into the interstices of said compact to firmly bond therewith and compressing the resulting sintered compact before cooling the same at a pressure in the range of from 400 to 600 p. s. i.

LEO CATALLO.

REFERENCES CITED

The following references are of record in the file of this patent:

UNITED STATES PATENTS

| Number | Name | Date |
| --- | --- | --- |
| 2,210,039 | Petrie | Aug. 6, 1940 |
| 2,228,871 | De Bats | Jan. 14, 1941 |